United States Patent [19]
Hopkins

[11] Patent Number: 5,426,676
[45] Date of Patent: Jun. 20, 1995

[54] EXTRUSION-RESISTANT SEAL ASSEMBLY

[75] Inventor: Ronald J. Hopkins, Pensacola, Fla.

[73] Assignee: Westinghouse Electric Corporation, Pittsburgh, Pa.

[21] Appl. No.: 139,673

[22] Filed: Oct. 22, 1993

[51] Int. Cl.⁶ .................................................. G21C 13/00
[52] U.S. Cl. ..................................... 376/203; 376/205; 376/206
[58] Field of Search ...................... 376/203, 205, 206; 277/218

[56] References Cited

U.S. PATENT DOCUMENTS

| | | | |
|---|---|---|---|
| 3,564,400 | 2/1971 | Pike et al. | 324/0.5 |
| 3,655,206 | 4/1972 | Adams | 277/87 |
| 3,661,409 | 5/1972 | Brown et al. | 285/82 |
| 4,233,926 | 11/1980 | Rogers et al. | 116/208 |
| 4,655,483 | 4/1987 | Margotta | 285/169 |
| 4,723,795 | 2/1988 | Shenoy | 285/138 |
| 4,733,554 | 3/1988 | Lazes | 73/46 |
| 4,747,601 | 5/1988 | Glachet | 277/12 |
| 4,778,189 | 10/1988 | Udagawa | 277/207 R |
| 4,807,262 | 2/1989 | Shields | 376/203 |
| 4,996,018 | 2/1991 | Bhatt et al. | 376/203 |
| 5,167,905 | 12/1992 | Mentz et al. | 376/204 |
| 5,172,920 | 12/1992 | Schlenk | 277/235 |
| 5,301,960 | 4/1994 | Meyer et al. | 277/229 |

FOREIGN PATENT DOCUMENTS 2063390 10/1980 United Kingdom .

Primary Examiner—Donald P. Walsh
Assistant Examiner—Meena Chelliah
Attorney, Agent, or Firm—Walter S. Stevens

[57] ABSTRACT

Extrusion-resistant seal assembly for sealing a gap defined between a first structure spaced-apart from a second structure, which first structure and second structure may be an annular first flange and an annular second flange belonging to an instrumentation column of the kind typically found penetrating nuclear reactor pressure vessels. The seal assembly includes an annular retainer disposed in a gap defined between the first flange and the second flange, the first flange and the second flange capable of being moved into close proximity to reduce the gap therebetween. The retainer includes a first surface thereon having a first recess extending therearound. The retainer also has a second surface thereon having a second recess extending therearound. An annular first gasket is retained in the first recess and an annular second gasket is retained in the second recess. The first gasket intimately engages the first flange as the second gasket intimately engages the second flange to seal the gap when the first and second flanges are brought into close proximity and clamped together. The first and second gaskets resist extrusion as they are compressed between the flanges and as they are subjected to high fluid pressure because the gaskets are constrained within their respective recesses and because the retainer bears the compressive load. In this manner, the seal assembly seals the gap as the first and second flanges are brought into close proximity and clamped together.

8 Claims, 6 Drawing Sheets

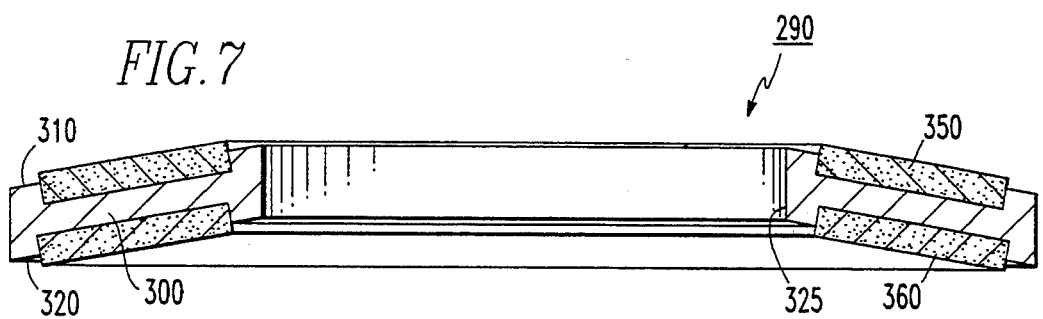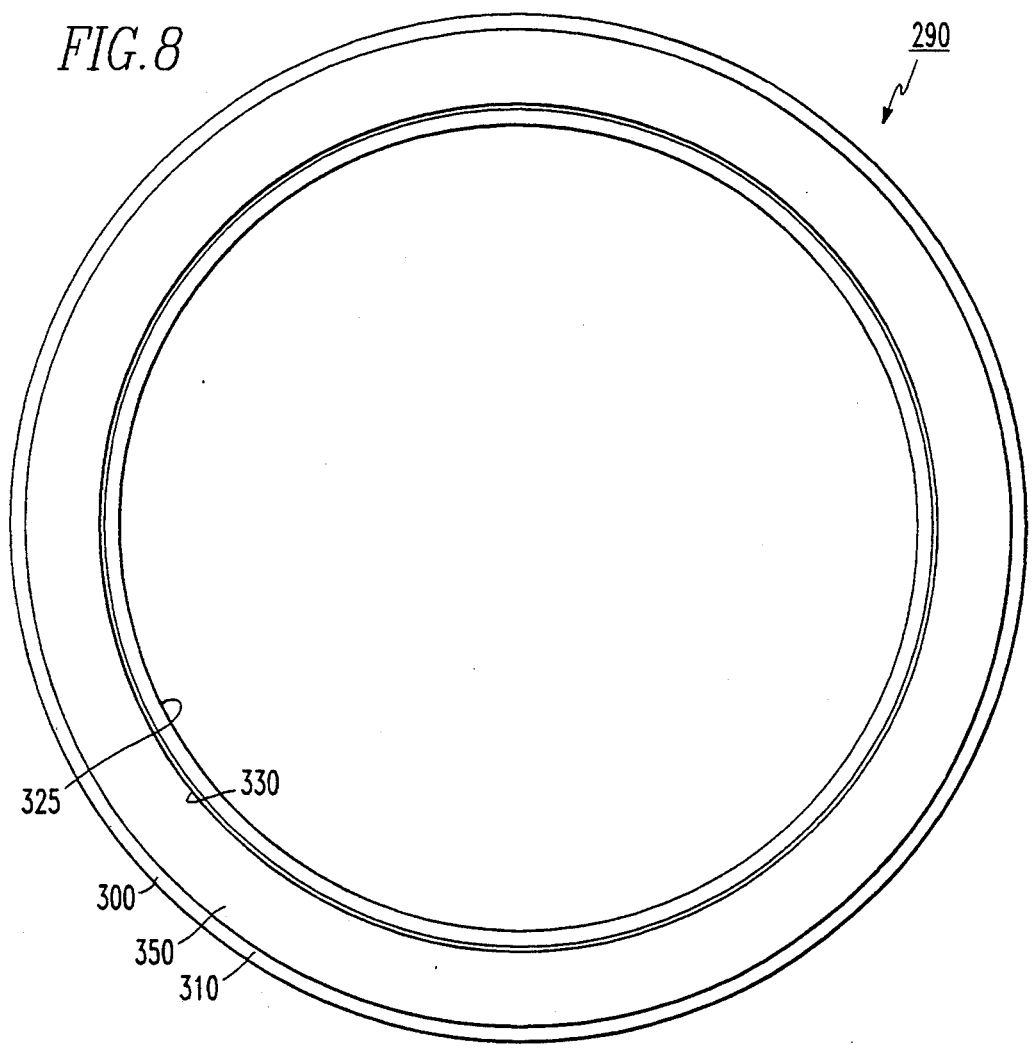

EXTRUSION-RESISTANT SEAL ASSEMBLY

BACKGROUND

This invention generally relates to seals and more particularly relates to an extrusion-resistant seal assembly for sealing a gap defined between a first structure spaced-apart from a second structure, which first structure and second structure may be a first flange and a second flange belonging to an instrumentation column of the kind typically found penetrating nuclear reactor pressure vessels.

Before discussing the current state of the art, it is instructive first to briefly describe the structure and operation of a typical nuclear reactor pressure vessel and its associated instrumentation columns. In this regard, a nuclear reactor pressure vessel is a device for producing heat by controlled fission of fissile material contained in a plurality fuel rods grouped to form a plurality of fuel assemblies disposed in the pressure vessel. The plurality of fuel assemblies define a nuclear reactor core in the pressure vessel. The pressure vessel itself includes a shell having an open top end and a closure head sealingly capping the open top end of the shell, so that the pressure vessel may be suitably pressurized thereby. A plurality of absorber rods slidably extend into each fuel assembly for controlling the fission process therein. Liquid moderator coolant (i.e., demineralized borated water), which may be pressurized to a pressure of approximately 2,500 psia during normal operation or approximately 3,000 psia during off-normal operation (e.g., during "overpressure" transients), is caused to flow over the fuel rods disposed in the pressure vessel for assisting in the fission process and for removing the heat produced by the fission process. During operation of the nuclear reactor, heat due to fission of the fissile fuel material is carried from the fuel rods by the liquid moderator coolant flowing over the fuel rods, which liquid moderator coolant becomes radioactive as it flows over the fuel rods. The heat carried away by the liquid moderator coolant is ultimately transferred to a turbine-generator set for generating electricity in a manner well known in the art.

Penetrating the closure head are a plurality of elongated instrumentation columns, each instrumentation column having a longitudinal bore therethrough for receiving instrumentation wiring connected to an instrumentation probe located in the reactor core. The bore of the instrumentation column is typically in fluid communication with the pressurized reactor coolant circulating through the pressure vessel. Each probe is designed to measure predetermined core physics quantities (e.g., temperature, neutron flux, etc.) in the reactor core. Moreover, the instrumentation column is segmented for ease of assembly and servicing. The ends of at least some of the segments include opposing generally circular flanges, which are capable of being moved into close proximity and connected together for completing the assembly of the segmented instrumentation column. At least one of these pair of opposing flanges is located externally to the pressure vessel.

As stated hereinabove, the pressurized radioactive coolant is in fluid communication with the bore of the instrumentation column. Therefore, for safety reasons, it is prudent to provide suitable seals at the interface of the flanges to prevent leakage of the pressurized radioactive coolant from between the flanges.

In this regard, it is known that graphite is useable as a seal material because when clamped between opposing structures, it has a relatively higher compressibility than, for example, an all-steel seal. More specifically, it is known that an all-graphite seal can compress approximately 30% more than an all-steel seal. However, it is also known that graphite seals are most suitable to seal against relatively low fluid pressures of about 600 psia. When exposed to higher fluid pressures, such all-graphite seals tend to experience what is termed in the art as "blow-out". That is, when an all-graphite seal "blows-out", it tends to extrude, thereby compromising the ability of the all-graphite seal to maintain its sealing function. Therefore, although all-graphite seals can withstand relatively high compression, they tend to extrude at the relatively high fluid pressures (e.g. 2,500–3,000 psia) achievable in nuclear reactor pressure vessels. Hence, a problem in the art is to provide a suitable graphite seal for use in nuclear reactor pressure vessel instrumentation columns, the seal being capable of withstanding relatively high pressure without extrusion or "blow-out".

A graphite seal is disclosed in U.S. Pat. No. 3,564,400 titled "Nuclear Magnetic Resonance Flowmeter Employing Ceramic Tube" issued Feb. 16, 1971 in the name of Ronald L. Pike et al. The Pike et al. patent relates to a nuclear magnetic resonance (or NMR) flowmeter, and particularly to such a flowmeter in which a ceramic tube is employed as the central conduit for conveying paramagnetic fluid. This patent discloses a flange secured to an end plate by means of bolts. A graphite sealing ring is disposed between the end plate and the flange in an annular recess provided in the exterior surface of the end plate. The interior side of the flange is provided with a boss, which has dimensions comparable to those of the annular recess. When the bolts are tightened, the graphite ring is compressed in the recess between the end plate and the boss, and is distorted under pressure to flow outwardly from the recess and fill up any space between the tube and the surfaces of the end plate and the flange. Therefore, this patent does not appear to disclose a graphite seal assembly configured to resist extrusion.

Although the above recited prior art discloses a graphite seal, the above recited prior art does not appear to disclose a high pressure extrusion-resistant seal assembly for sealing a gap defined between a first structure spaced-apart from a second structure, which first structure and second structure may be a first flange and a second flange, respectively, belonging to an instrumentation column of the kind typically found penetrating nuclear reactor pressure vessels.

Therefore, what is needed is an extrusion-resistant seal assembly for sealing a gap defined between a first structure spaced-apart from a second structure, which first structure and second structure may be a first flange and a second flange, respectively, belonging to an instrumentation column of the kind typically found penetrating nuclear reactor pressure vessels.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

FIG. 7 is a view in vertical section of the seal assembly; and

FIG. 8 is a plan view of the seal assembly.

SUMMARY OF THE INVENTION

Figure 1:
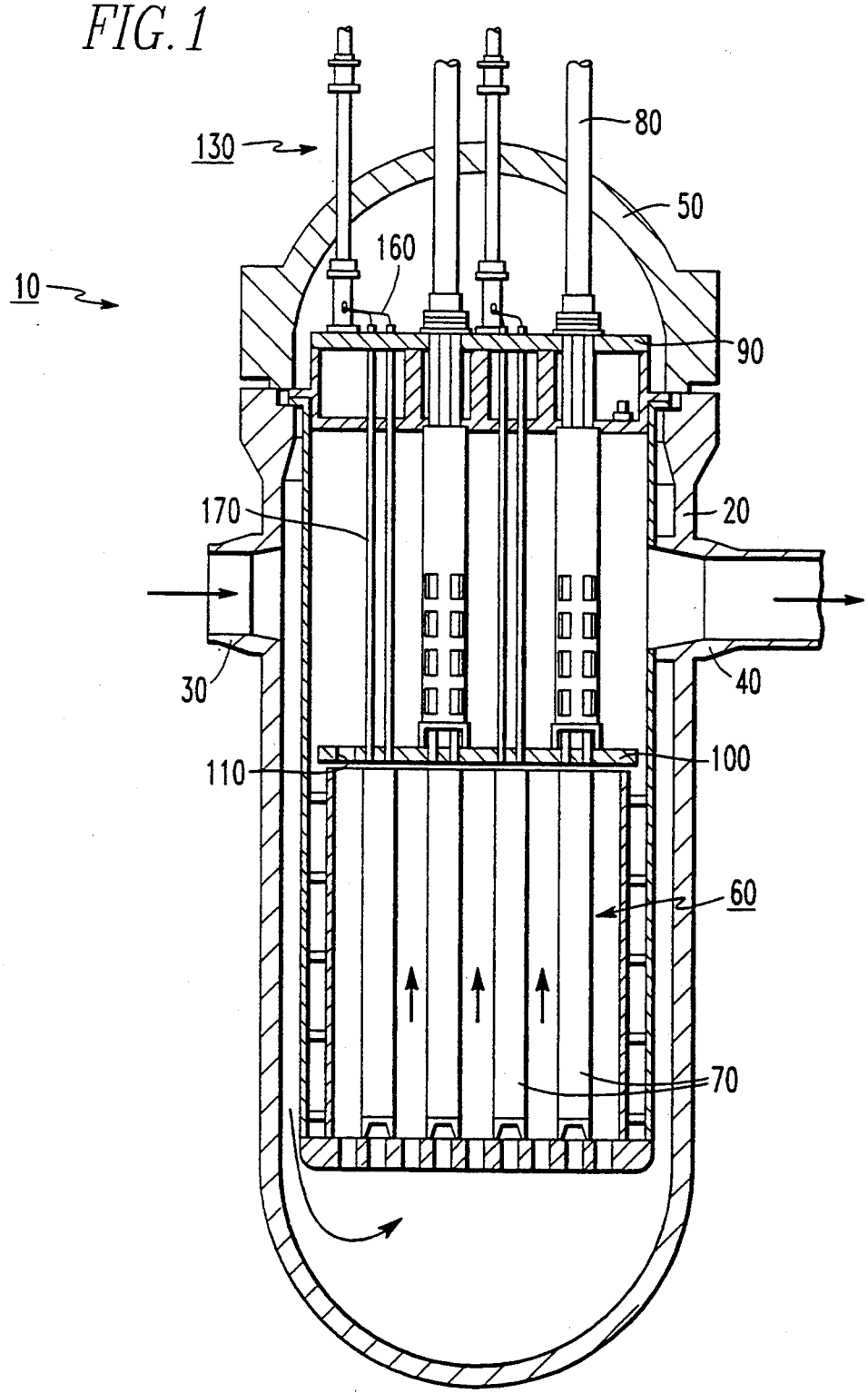
FIG. 1 shows in partial vertical section, a typical nuclear reactor pressure vessel with parts removed for clarity, the pressure vessel having a plurality of instrumentation columns penetrating thereinto.

Disclosed herein is an extrusion-resistant seal assembly for sealing a gap defined between a first structure spaced-apart from a second structure, which first structure and second structure may be an annular first flange and an annular second flange belonging to an instrumentation column of the kind typically found penetrating nuclear reactor pressure vessels. The seal assembly includes an annular retainer disposed in a gap defined between the first flange and the second flange, the first flange and the second flange capable of being moved into close proximity to reduce the gap therebetween. The retainer includes a first surface thereon having a first recess extending therearound. The retainer also has a second surface thereon having a second recess extending therearound. An annular first gasket is retained in the first recess and an annular second gasket is retained in the second recess. The first gasket intimately engages the first flange and the second gasket intimately engages the second flange to seal the gap as the first and second flanges are brought into close proximity and clamped together. The first and second gaskets resist extrusion as they are compressed between the flanges and as they are subjected to high fluid pressure because the gaskets are constrained within their respective recesses and because the retainer bears the compressive load. In this manner, the seal assembly seals the gap as the first and second flanges are brought into close proximity and clamped together.

In its broad form, the invention is an extrusion-resistant seal assembly, comprising a retainer having a recess therein and a gasket retained in the recess.

An object of the present invention is to provide an extrusion-resistant seal assembly for sealing a gap defined between a first structure spaced-apart from a second structure, which first structure and second structure may be a first flange and a second flange belonging to an instrumentation column of the kind typically found penetrating nuclear reactor pressure vessels.

A feature of the present invention is the provision of an annular stainless steel retainer disposed in a gap defined between two opposing flanges belonging to a nuclear reactor pressure vessel instrumentation column, the retainer having an annular top recess and an annular bottom recess extending therearound. An annular graphite top gasket is retained in the top recess and an annular graphite bottom gasket is retained in the bottom recess.

An advantage of the present invention is that the top and bottom graphite gaskets retained in the top and bottom recesses, respectively, resist extrusion even under relatively high pressures so that the gap is suitably sealed thereby.

These and other objects, features and advantages of the present invention will become evident to those skilled in the art upon a reading of the following detailed description taken in conjunction with the drawings wherein there is shown and described illustrative embodiments of the invention.

DESCRIPTION OF THE PREFERRED EMBODIMENT

Referring to FIG. 1, there is shown a typical nuclear reactor pressure vessel, generally referred to as 10, for producing heat by the controlled fission of fissile nuclear fuel material (not shown). Pressure vessel 10 includes a vertically-oriented vessel shell open at its top end and having a plurality of inlet nozzles 30 and outlet nozzles 40 attached to the upper portion thereof (only one of each nozzle is shown). A hemispherical closure head is mounted atop vessel shell 20 and is sealingly attached to the open top end of vessel shell 20, so that closure head 50 sealingly caps vessel shell 20. Capping vessel shell 20 in this manner allows for suitable pressurization of the coolant within vessel shell 20 as pressure vessel 10 operates.

Still referring to FIG. 1, disposed in pressure vessel 10 is a nuclear reactor core, generally referred to as 60, containing the nuclear fuel which is disposed in a plurality of fuel assemblies 70. A plurality of control rod drive assemblies 80 penetrate the top of closure head 50, each control drive assembly 80 including a plurality of movable control rods (not shown) slidably extending into fuel assemblies 70 for controlling the fission process in fuel assemblies 70 in a manner well known in the art. Disposed inwardly of vessel shell 20 is a horizontal upper support plate 90 that transmits mechanical loads from reactor core 60 and other internal components to the wall of vessel shell 20. A horizontal upper core plate 100 is also disposed inwardly of vessel shell 20 for supporting and locating the top ends of fuel assemblies 70, which upper core plate 100 is spaced below upper support plate 90. Upper core plate 100 has a multiplicity of coolant flow orifices 100 for flow of the pressurized liquid moderator coolant (i.e., demineralized borated water) therethrough. Penetrating closure head 50 and connected to the top of upper support plate is an elongate instrumentation column, generally referred to as 130, for reasons disclosed hereinbelow. Instrumentation column 130 may include a plurality of segments, such as segments 135/137/139, for ease of assembly and servicing.

During operation of pressure vessel 10, the coolant, which may be pressurized to approximately 2,500 psia during normal operation or approximately 3,000 psia during off-normal operation (e.g., during "overpressure" transients), enters inlet nozzle 30 and circulates through vessel shell 20 to eventually exit through outlet nozzle 40, whereupon it is piped to a heat exchange device (not shown) for generating steam. In this regard, the coolant circulates through pressure vessel 10 generally in the direction of the arrows shown in FIG. 1. The steam is then piped from the heat exchange device to a turbine-generator set (not shown) for producing electricity in a manner well understood in the art.

Figure 2:
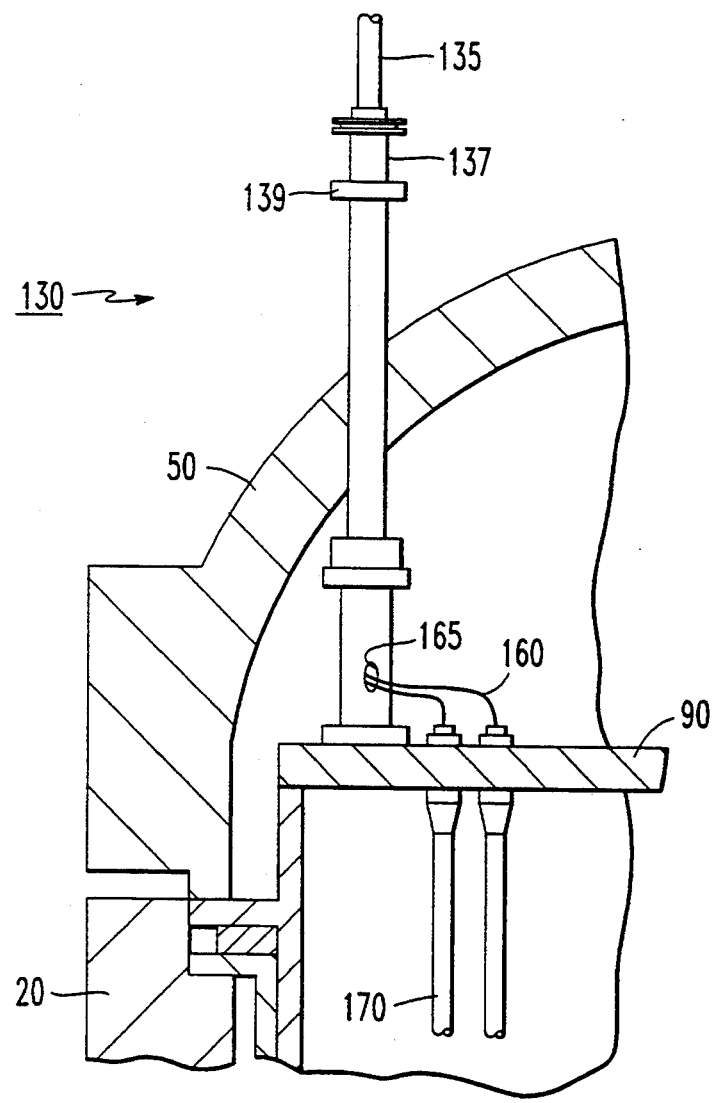
FIG. 2 is a fragmentation view in partial vertical section of the pressure vessel having one of the instrumentation columns penetrating thereinto.
Figure 3:
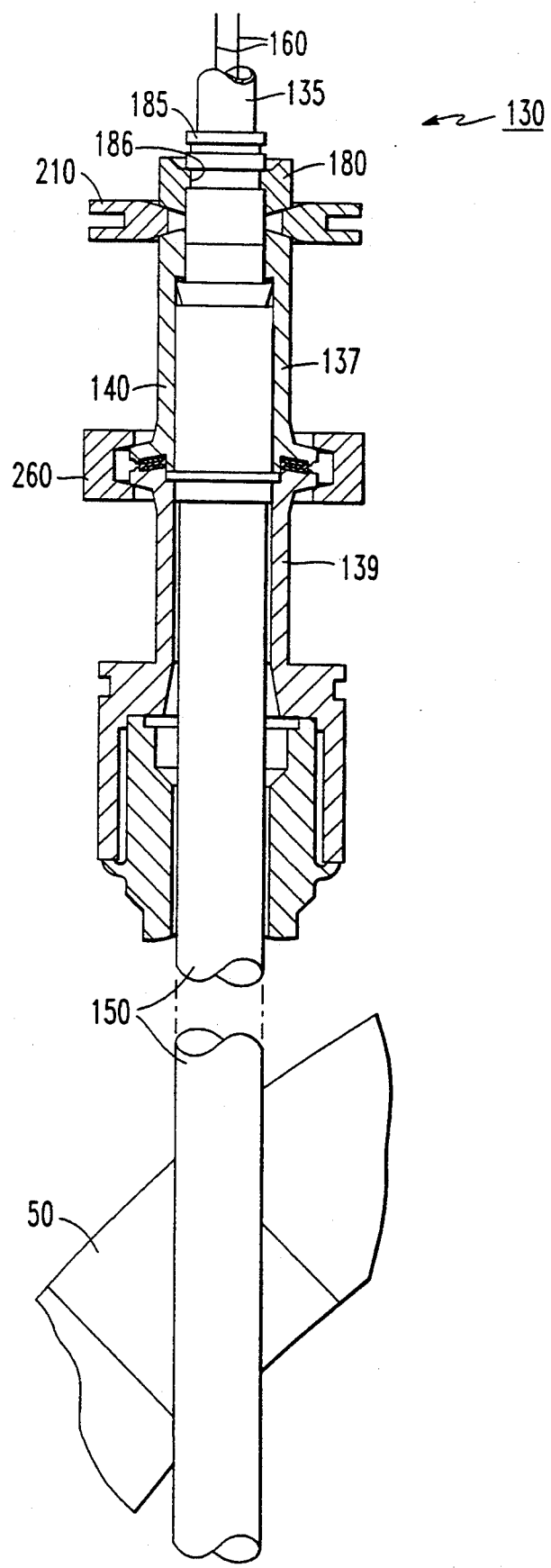
FIG. 3 is a view in partial vertical section of a portion of the instrumentation column, the instrumentation column including two pairs of opposing flanges.

Referring to FIGS. 1, 2 and 3, instrumentation column 130 has a longitudinal bore 140 therethrough for receiving a hollow elongate shroud, such as an elongate thermocouple column 150. Thermocouple column 150 has wiring 160 extending therethrough, the wiring 160 being connected to a core physics device (not shown), such as a suitable thermocouple, for measuring core physics quantities (e.g., temperature) in reactor core 60. Instrumentation column 130 includes at least one opening 165 in the side thereof for allowing passage of wires 160 therethrough. Moreover, after passing through opening 165, wires 160 may pass through suitably sized openings (not shown) in upper support plate 90. From there the wires 160 may pass into associated ones of a plurality of elongate hollow instrumentation tubes 170. Each instrumentation tube 170 has an upper end thereof connected to upper support plate 90 and also has a lower end thereof connected to upper core plate 100, each instrumentation tube 170 being suitably aligned with its associated fuel assembly 70. An end of each wire 160 is electrical connected to the previously mentioned core physics device, which is itself disposed in its respective fuel assembly 70.

Figure 4:
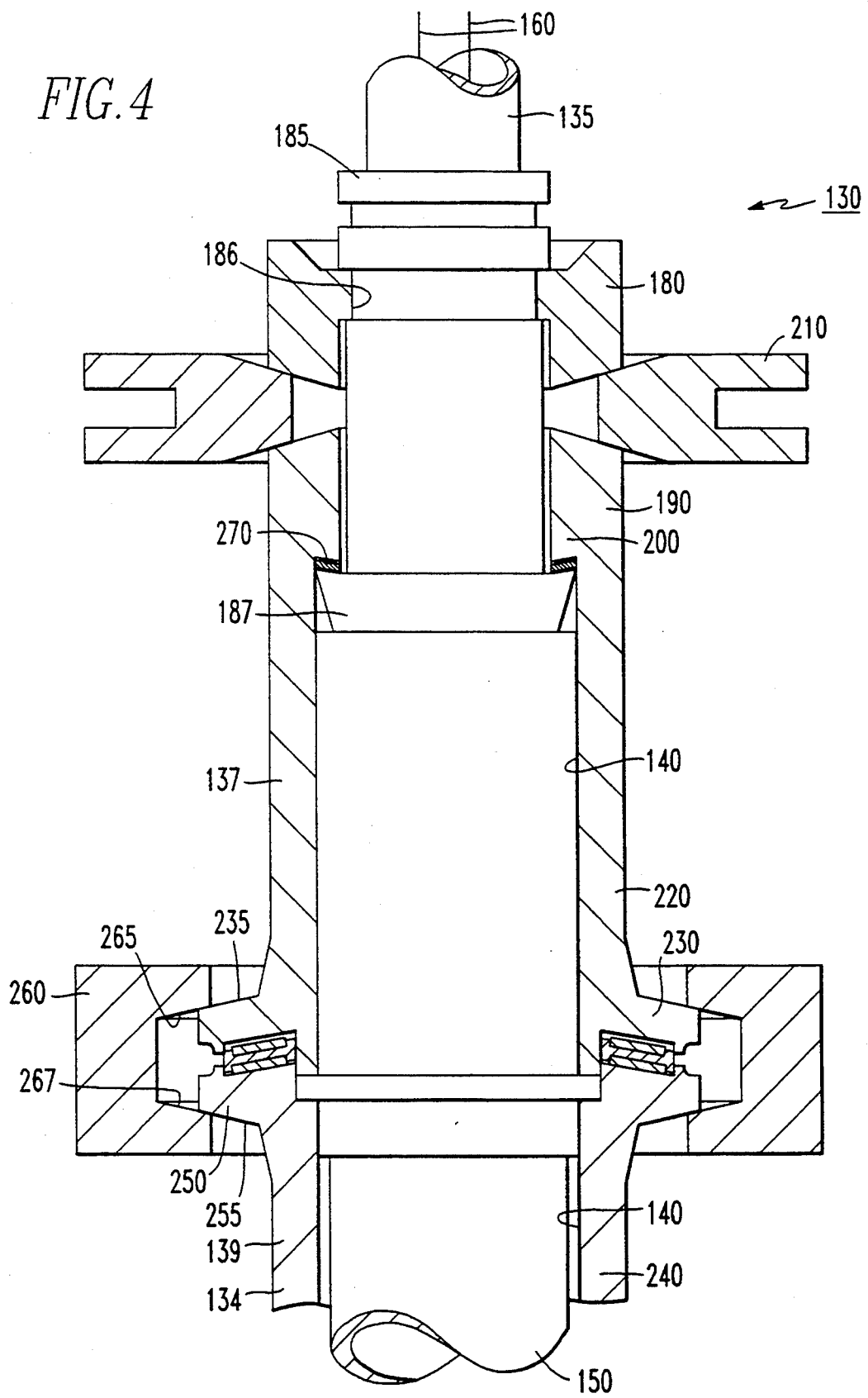
FIG. 4 is a view in partial vertical section of the instrumentation column, the instrumentation column including two pairs of opposing flanges defining a gap therebetween and also including the extrusion-resistant seal assembly of the present invention disposed in the gap between each pair of flanges.
Figure 5:
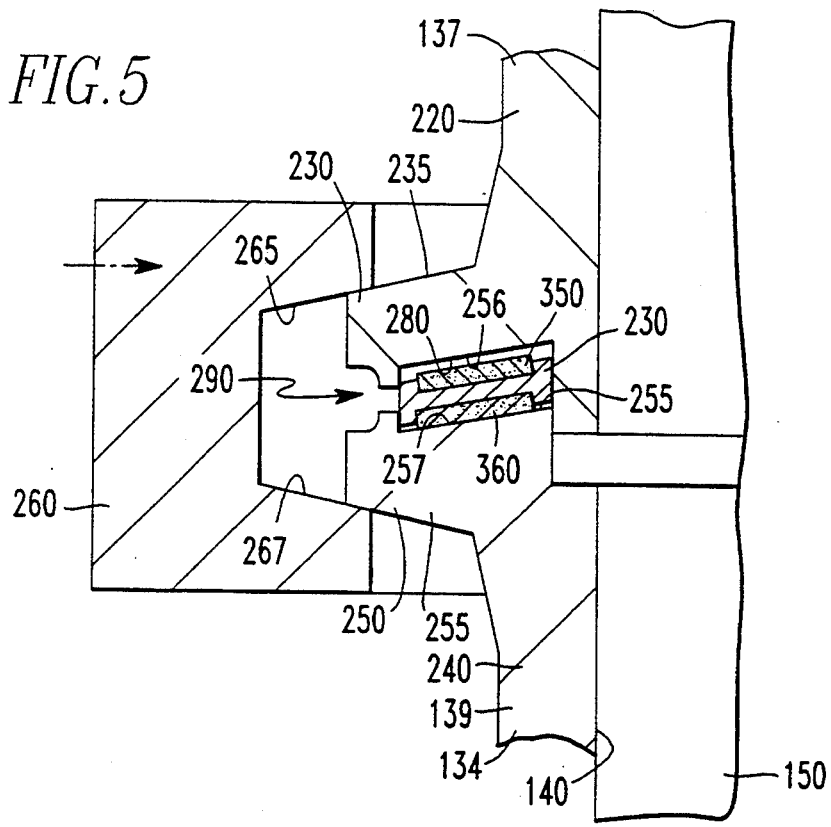
FIG. 5 is a view in vertical section of the seal assembly disposed in the gap between one of the pair of the flanges prior to the flanges being moved into close proximity to seal the gap therebetween.

As best seen in FIGS. 3 and 4, first segment 135 has an annular positioner member 180 surrounding a proximal end portion 185 thereof, the positioner member 180 engaging an annular groove 186 formed in first segment 135 in order to fix the position of positioner member 180 on first segment 135. Moreover, proximal end portion 185 of first segment 135 also includes an annular outwardly-directed integrally attached flange 187. Spaced-apart and disposed below positioner member 180 is a second segment 137. Second segment 137 has a distal end portion 190 having an annular inwardly-directly flange 200 integrally attached thereto and coaxially disposed opposite and above flange 187. Matingly interposed between positioner 180 and second segment 137 are a plurality of annular wedge-shaped first clamp members 210 for moving flange 200 and 187 into close proximity. Second segment 137 also has a proximal end portion 220 having an outwardly directed integrally attached annular flange 230 extending therearound. Flange 230 has an upwardly facing chamfered surface 235 thereon for reasons disclosed hereinbelow. Moreover, spaced-apart and below second segment 137 is a third segment 139 having a distal end portion 240 that in turn has an annular outwardly-directed integrally attached flange 250 extending therearound, flange 250 defining a downwardly facing chamfered surface 255 thereon. Formed on the bottom surface of flanges 200/230 is an annular generally downwardly sloping or canted groove 256 for reasons disclosed hereinbelow. In addition, formed on the top surface of flanges 187/250 is an annular generally downwardly sloping or canted groove 257 for reasons disclosed hereinbelow. Flange 230 is coaxially disposed opposite and above flange 250. Interconnecting flange 230 and flange 250 are a plurality of annular second clamps 260 for moving flange 230 and flange 250 into close proximity, so that second segment 137 and third segment 139 may be locked or clamped together. Each first clamp member 260 has a downwardly facing chamfered surface 265 thereon for matingly slidably engaging the chamfered surface 235 of flange 230 and also an upwardly facing chamfered surface 267 thereon for matingly slidably engaging the chamfered surface 255 of flange 250. It will be understood from the description hereinabove that spaced-apart flanges 200 and 187 define a first gap 270 therebetween and spaced-apart flanges 230 and 250 define a second gap 280 therebetween. Moreover, it will be understood with reference to the drawings that the terminology "proximal end portion" means that end portion nearer reactor core 60 and the terminology "distal end portion" means that end portion further away from reactor core 60.

It will be appreciated from the description hereinabove that the pressurized radioactive coolant is in fluid communication with bore 140. Therefore, for safety reasons, it is prudent to provide suitable seals between flanges 187/200 (i.e., gap 270) and between flanges 230/250 (i.e., gap 280) to seal gaps 270/280 so as to prevent leakage of the pressurized radioactive coolant through gaps 270/280.

Therefore, referring now to FIGS. 3, 4, 5, 6, 7 and 8, there is shown an extrusion-resistant seal assembly, generally referred to as 290, for sealing gaps 270/280 defined between a first structure spaced-apart from a second structure, which first structure and second structure may be first flange 200/230 and second flange 187/250, respectively, belonging to the instrumentation column 130 which is shown penetrating closure head 50 of nuclear reactor pressure vessel 10. For purposes of convenience only, seal assembly 290 will be described hereinbelow with reference to sealing second gap 280. However, it will be appreciated that seal assembly 290 may be equally useable for sealing first gap 270 or any similar gap defined between two opposing structures.

Still referring to FIGS. 3, 4, 5, 6, 7 and 8, seal assembly 290 comprises a generally annular retainer 300, which may be stainless steel for resisting primary water stress corrosion cracking caused by the borated reactor coolant. Retainer 300 has an exterior top surface 310 and an exterior bottom surface 320 thereon. Moreover, retainer 300 has a centrally disposed opening 325 therethrough for passage of thermocouple column 150. Formed in top surface 310 is a circular or annular top recess 330 extending therearound for reasons disclosed presently. Moreover, formed in bottom surface 320 is a circular or annular bottom recess 340 extending therearound for reasons disclosed presently. Matingly constrained or retained in top recess 330 is an annular top seal or gasket 350, which is preferably graphite for reasons disclosed hereinbelow. In addition, matingly constrained or retained in bottom recess 340 is a bottom seal or gasket 360, which is also preferably graphite. Gaskets 350/360 may be bonded in recesses 330/340, respectively, such as by a suitable adhesive resistant to radiation degradation. Bonding gaskets 350/360 within their respective recesses 330/340 will permanently affix them within the recesses 330/340. Affixing gaskets 350/360 within their respective recesses 330/340 provides additional assurance that gaskets 350/360 will not inadvertently disassociate from recesses 330/340 and become loose parts within pressure vessel 10. The presence of loose parts within pressure vessel 10 is highly undesirable for safety reasons.

With particular reference to FIG. 7, seal assembly 290 has a generally canted (i.e., 10° with respect to the horizontal) transverse cross section so that it will matingly fit within grooves 256/257.

Figure 6:
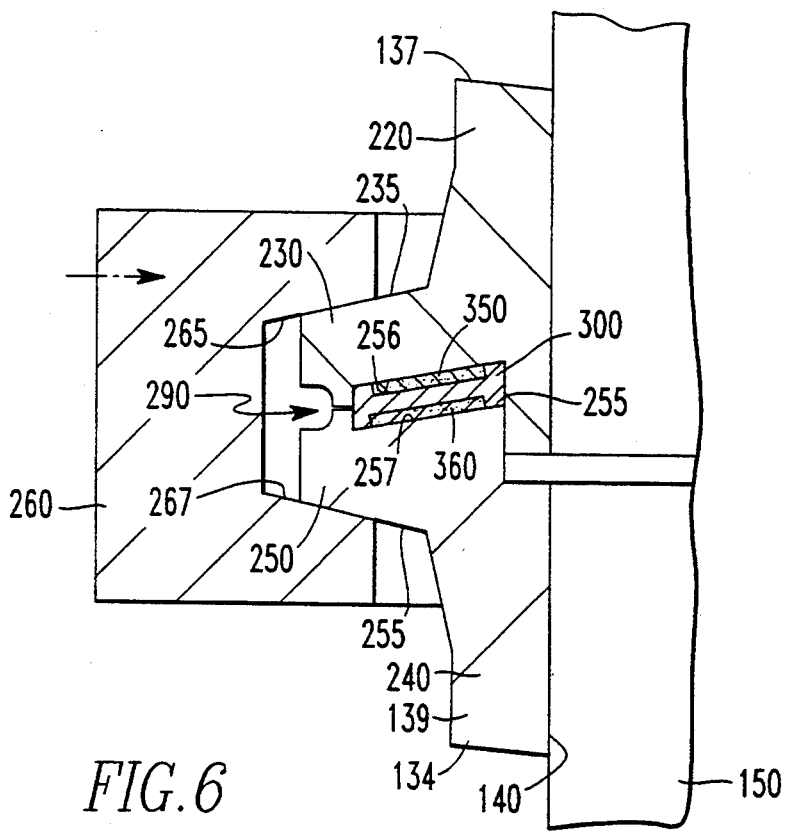
FIG. 6 is a view in vertical section of the seal assembly disposed between one of the pair of the flanges after the flanges have been moved into close proximity to seal the gap therebetween.

As best seen in FIGS. 6 and 7, seal assembly 290 is capable of sealing gaps 270/280 so that the pressurized coolant does not flow therethrough. In this regard, first gasket 350 will intimately engage groove 256 formed in first flange 230 and second gasket 360 will intimately engage groove 257 formed in second flange 250 as flanges 230/250 are brought into close proximity and clamped together. As flanges 230/250 are brought into close proximity, gaskets 350/260 will bear a compressive load due to their intimate engagement with their associated flanges 230/250. However, gaskets 350/360 will not substantially radially extrude under such a compressive load because they are constrained within their respective recesses 330/340 and because the compressive load borne by gaskets 350/360 is substantially transferred to retainer 300. Moreover, gaskets 350/360 will not substantially radially extrude when exposed to the relatively high pressure of the coolant in bore 140 because they are constrained within their respective recesses 330/340 and because the pressure borne by gaskets 350/260 is transferred to retainer 300. Therefore, gaskets 350/360, when installed during operation of pressure vessel 10, prevent the pressurized coolant from flowing past seal assembly 290 and through gaps 270/280.

OPERATION

Extrusion-resistant seal assembly 290 is interposed between flanges 200 and 187 and also between flanges 230 and 250 for sealing first gap 270 and second gap 280, respectively. For purposes of convenience only, use of seal assembly 290 will be described hereinbelow with reference to the method of sealing second gap 280. However, it will be appreciated that seal assembly 290 may be equally useable for sealing first gap 270 or any similar gap defined between two opposing structures. In this regard, seal assembly 290 is interposed between flanges 230/250, such that seal assembly 290 rests in groove 257 formed in flange 250. Next, each second clamp 260 is inwardly moved, generally horizontally, such as illustrated by the straight horizontal arrow shown in FIGS. 5 and 6. In this manner, chamfered surfaces 265/267 of second clamp 260 progressively slidably engage chamfered surfaces 235/255 of flanges 230 and 250, respectively, in order to move flanges 230 and 250 into close proximity.

As flanges 230 and 250 are moved into close proximity, in the manner disclosed hereinabove, top gasket 350 and bottom gasket 360 will intimately engage groove 256 and groove 257, respectively (see FIG. 6). As gaskets 350/360 intimately engage grooves 256/257, respectively, the pressurized coolant will not admit past gaskets 350/360 to exit through second gap 280. In this manner, second gap 280 is sealed. First gap 270 is sealed in a similar manner.

As pressure is exerted by the coolant against gaskets 350 and 360, this pressure will be transferred to retainer 300 because gaskets 350 and 360 are matingly retained with recesses 330 and 340, respectively, of retainer 300. Thus, graphite gaskets 350 and 360 will coact with retainer 300 so as to maintain their sealing function without "blow-out" because they do not solely bear the relatively high pressure of the coolant.

Although the invention is fully illustrated and described herein, it is not intended that the invention as illustrated and described be limited to the details shown, because various modifications may be obtained with respect to the invention without departing from the spirit of the invention or the scope of equivalents thereof. For example, the use of seal assembly 290 need not be limited to sealing the gaps 270/280 of the nuclear pressure vessel instrumentation column 130; rather, seal assembly 290 is usable whenever it is desired to seal any similar gap defined between two opposing structures.

Therefore, what is provided is an extrusion-resistant seal assembly for sealing a gap defined between a first structure spaced-apart from a second structure, which first structure and second structure may be a first flange and a second flange belonging to an instrumentation column of the kind typically found penetrating nuclear reactor pressure vessels.

What is claimed is:

1. An extrusion-resistant seal assembly for sealing a gap defined between a first structure spaced-apart from a second structure, the first structure and the second structure capable of being moved to reduce the gap defined therebetween, comprising:
   (a) a retainer disposed in the gap, said retainer having a recess therein; and
   (b) a gasket retained in the recess to seal the gap as the first structure and the second structure are moved to reduce the gap defined therebetween.

2. An extrusion-resistant seal assembly for sealing an annular gap defined between an annular first flange spaced-apart from an annular second flange, the first flange and the second flange capable of being moved into close proximity to reduce the gap defined therebetween, comprising:
   (a) an annular retainer disposed in the gap, said retainer having a first surface thereon having an annular first recess extending around the first surface and having a second surface thereon having an annular second recess extending around the second surface;
   (b) an annular first gasket retained in the first recess; and
   (c) an annular second gasket retained in the second recess, whereby said first gasket intimately engages the first flange and said second gasket intimately engages the second flange as the first flange and the second flange are moved into close proximity and whereby said first gasket is retained in the first recess and said second gasket is retained in the second recess for preventing extrusion of said first gasket and said second gasket as said first gasket intimately engages the first flange and as said second gasket intimately engages the second flange to seal the gap defined therebetween.

3. The seal assembly of claim 2, wherein said first gasket and said second gasket are graphite for bearing compressive load as said first gasket and said second gasket intimately engages the first flange and the second flange, respectively.

4. The seal assembly of claim 3, wherein said first gasket and said second gasket are respectively bonded in the first recess and in the second recess for affixing said first gasket in the first recess and for affixing the second gasket in the second recess.

5. In a nuclear reactor pressure vessel instrumentation column having a pressurized fluid therein, the column having an annular top flange spaced-apart from an annular bottom flange, the top flange and the bottom flange defining an annular gap therebetween capable of allowing the pressurized fluid to pass therethrough, the top flange and the bottom flange capable of being moved into close proximity to reduce the gap defined therebetween, an extrusion-resistant seal assembly for sealing the gap against passage of the fluid, the extrusion-resistant seal assembly comprising:

(a) an annular retainer disposed in the gap, said retainer having an exterior top surface thereon having an annular top recess extending around the top surface and having an exterior bottom surface thereon having an annular bottom recess extending around the bottom surface;

(b) an annular top gasket matingly retained in the top recess; and (c) an annular bottom gasket matingly retained in the bottom recess, whereby said top gasket intimately engages the top flange and said bottom gasket intimately engages the bottom flange to seal the gap against passage of the pressurized fluid therethrough, whereby said top gasket and said bottom gasket are retained in the top recess and the bottom recess, respectively, and whereby said top gasket, said bottom gasket and said retainer coact to transfer the pressure of the fluid from said top gasket and said bottom gasket to said retainer so that said top gasket and said bottom gasket resist extrusion.

6. The seal assembly of claim 5, wherein said top gasket and said bottom gasket are graphite for bearing a compressive load as said top gasket and said bottom gasket intimately engage the top flange and the bottom flange, respectively.

7. The seal assembly of claim 6, wherein said top gasket and said bottom gasket are respectively bonded in the top recess and in the bottom recess for affixing said top gasket and said bottom gasket in the top recess and in the bottom recess, respectively.

8. The seal assembly of claim 7, wherein said retainer is stainless steel for resisting stress corrosion cracking.

* * * * *